United States Patent Office.

FERDINAND LASCAR, OF NEW YORK, N. Y., ASSIGNOR TO FREDERICK SPIEGELBERG, OF SAME PLACE.

FILTERING MATERIAL.

SPECIFICATION forming part of Letters Patent No. 488,317, dated December 20, 1892.

Application filed February 11, 1892. Serial No. 421,089. (No specimens.)

*To all whom it may concern:*

Be it known that I, FERDINAND LASCAR, a citizen of the United States, and a resident of New York, in the county and State of New York, have invented certain new and useful Improvements in Filtering Material, of which the following is a specification.

My invention has reference to improvements in filtering materials adapted for use either alone or in combination with other filtering materials for filtering water and other liquids and for acting upon the same chemically to destroy bacteria, white algæ; to neutralize ammonia compounds and free ammonia, or in other words, to render water, containing impurities dangerous to health and life, clear, clean, and palatable.

I have found that tannate of iron has the property of forming insoluble combinations with albuminoid ammonia, and that it destroys bacteria, white algæ and other nitro-organisms, so that when contaminated water is brought in contact with tannate of iron, it becomes purified and deodorized. If therefore, tannate of iron is fixed upon a suitable filtering substance, which by itself mechanically intercepts the passage therethrough of bacteria and insoluble impurities, the water passing through that substance will be filtered both mechanically and chemically. I have found also that jute fiber is an excellent mechanical filter, and that it can be impregnated with tannate of iron without affecting the elasticity and the strength of the fiber; so that this fiber when thus impregnated with tannate of iron, will not become unduly packed or felted but will remain as elastic as it was before impregnated. It will, therefore, continue to act as an excellent mechanical filter, while, by reason of the presence of the tannate of iron, it will also act as a chemical filter as above indicated.

My invention therefore consists in a mechanico-chemical filter, composed of jute, impregnated with tannate of iron, or, as will hereinafter appear, with gallo-tannate of iron.

For the purpose of my invention it is immaterial in what manner the jute is impregnated with tannate of iron or with gallo tannate of iron, provided the jute is thoroughly cleansed before impregnation, but the process which I have practiced with great success and which I prefer, is as follows: The jute is first immersed in a bath of diluted hydro-chloric acid, and while I am not confined to any particular degree of dilution of the acid, I have found that the proportion of one part of chemically pure hydro-chloric acid, to nineteen parts of water, answers my purpose; and if this strength is used the jute need only remain about ten minutes in the bath, after which it is removed and washed in water. In this manner the jute is thoroughly cleansed from all impurities, and I prefer to use hydro-chloric acid for this purpose in preference to other substances which might be used, be cause in the first place, the hydro-chloric acid is easily washed out by water, and in the second place, it is not necessary to be particularly careful in this respect, since the traces of hydro-chloric acid, which may still remain on, or in the jute, do no harm, since they combine with the ingredients used in the further treatment of the jute. After the washing, the jute may be dried, although it is sufficient that the water be drained off. The mass is then immersed in a bath as follows: eight fluid ounces of a solution of sesquichloride of iron of the strength prescribed by the *United States Pharmacopœia*. Two hundred grains of permanganate of potash, and ten gallons of water. This bath is heated to a temperature of 80° centigrade, and the jute is allowed to remain in the bath for about two hours, the temperature of the bath being maintained at about 80° centigrade in any suitable manner. The jute is then taken out of the bath and spread on boards to allow the superfluous liquid to drain off, and is then transferred to a boiler filled with a four per cent. tannic acid solution and is there boiled from a period of twenty to thirty minutes. In this manner the sesquichloride of iron with which the jute has been impregnated, is converted into tannate of iron, and the object of my process is thus accomplished. In this step of the process, the permanganate of potash might be omitted, but I have found that its use is beneficial, in so far as it promotes the impregnation with sesquichloride of iron. Similarly I have found that to the tannic acid solution, may be added with great advantage, one quarter per cent. of gallic acid. If the gallic acid is not used, the resultant product upon and in the jute, is tannate of iron or digallate of iron, while when gallic acid is used in addition to the tannin, tetra-gallate of iron is also formed upon and in the jute, whereby the purifying effects of the filtering material are increased. It will consequently be understood that in place of the tannin, I may use gallic acid altogether, but since this substance is by far more expensive than tannin, the latter with a small addition of gallic acid is preferably used. After the boiling of the jute in the tannic acid solution, or in the gallic acid solution, or in a mixture of both, it is removed from the boiler and washed in clear water until the latter ceases to be colored. The jute is then pressed, spread out and dried in a warm place at a temperature not exceeding 80°, centigrade.

The jute thus prepared is absolutely free from all impurities, and is very effective as a filtering material. By reason of its structure, it prevents the passage therethrough of sacrophyces, vibriones, flagellata, microscopical algæ, and other micro-organisms; and in addition thereto, these organisms are decomposed by the tannate of iron, as are all albuminous compounds. These being the characteristics of my improved filtering material it may properly be defined by the appellation, "anti-septic and anti-bacterial jute."

While I have found that jute is an excellent material serving as a base or carrier for the tannate of iron, I do not mean to be absolutely confined to the use of the jute, since I have found that the vegetable fiber, known as ramie may be impregnated with the tannate of iron by my process with good effect, and may be used as a substitute for jute. I therefore use the term "jute" generically as covering, not only jute proper, but also other vegetable fibers which have the same or similar characteristics, and more especially do I use this term to cover the fiber known as ramie.

A remarkable characteristic of jute, which renders it superior to other fibrous substances as a chemico-mechanical filter, is that it absorbs and retains a greater quantity of liquids than other fibers, and more especially a greater quantity than flax, hemp wool, cotton, sponges, hair, and all other fibers. Jute has therefore a greater capacity for storing tannate of iron than other fibers, and being free from nitrogenous matter, it will resist decay a much longer time than substances containing such compounds.

Sponges, and organic porous substances, when used as filters, even when impregnated with tannate of iron, soon becomes a hot bed for bacterial life, because the impregnation is and can only be superficial; the same is true of cotton and the various felts, which moreover readily loose their elasticity, and pack permanently, and can, therefore, not be thoroughly cleansed by a return flow of water, as is now the common practice in improved filtering apparatus. In such apparatus fibrous materials are usually held under pressure, whereby inelastic fibers receive a permanent set, while jute does not receive such permanent set, so that when the pressure is relieved it rises again, offering a free passage for the return flow of the cleansing stream.

The great storage capacity for tannate of iron and the great elasticity of the fiber, are the characteristics which render jute so highly efficient as a chemico-mechanical filter, and these are the characteristics upon which I mainly rely.

My improved filtering material may be used in a variety of ways, either alone or combined with other filtering materials, as for instance, in the manner and in the combination set forth in Letters Patent No. 424,679, granted to me on April 1, 1890.

Having now fully described my invention, I claim and desire to secure my Letters Patent:

1. A filtering material consisting of jute impregnated with tannate of iron, substantially as described.

2. A filtering material consisting of jute impregnated with an iron salt, substantially as described.

3. A filtering material consisting of jute impregnated with digallate and tetra-gallate of iron, substantially as described.

In testimony whereof I have signed my name to this specification in the presence of two subscribing witnesses.

FERDINAND LASCAR.

Witnesses:
OWEN FITZSIMONS,
EDMOND E. WISE.